United States Patent
Stooker et al.

(10) Patent No.: US 9,974,317 B2
(45) Date of Patent: *May 22, 2018

(54) METHOD OF DEBONING ANIMAL THIGHS FOR SEPARATING AND COLLECTING MEAT THEREFROM AND APPARATUS FOR PERFORMING THE METHOD

(71) Applicant: Foodmate B.V., Oud-Beijerland (NL)

(72) Inventors: Dirk Cornelis Stooker, Oud-Beijerland (NL); Gerrit Hendrik Woltman, Oud-Beijerland (NL); Jacobus Eliza Hazenbroek, Oud-Beijerland (NL)

(73) Assignee: Foodmate B.V. (NL)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/419,791

(22) Filed: Jan. 30, 2017

(65) Prior Publication Data

US 2017/0258101 A1   Sep. 14, 2017

Related U.S. Application Data

(63) Continuation of application No. 13/803,156, filed on Mar. 14, 2013, now Pat. No. 9,572,355, which is a
(Continued)

(30) Foreign Application Priority Data

Jan. 26, 2011 (NL) .................................... 2006074
Nov. 3, 2011 (NL) .................................... 2007711

(51) Int. Cl.
*A22B 5/00* (2006.01)
*A22C 17/00* (2006.01)
*A22C 21/00* (2006.01)

(52) U.S. Cl.
CPC ........ *A22C 21/0076* (2013.01); *A22B 5/0035* (2013.01); *A22C 17/004* (2013.01); *A22C 21/0069* (2013.01)

(58) Field of Classification Search
CPC ... A22B 5/0017; A22B 5/0035; A22C 17/004; A22C 21/0069; A22C 21/0076
(Continued)

(56) References Cited

U.S. PATENT DOCUMENTS 3,261,054 A * 7/1966 Kaplan ................... A22C 17/04
                                                         452/136
5,203,736 A * 4/1993 Schulte .............. A22C 21/0076
                                                         452/127

* cited by examiner

*Primary Examiner* — David J Parsley
(74) *Attorney, Agent, or Firm* — Womble Bond Dickinson (US) LLP

(57) ABSTRACT

A method is disclosed of mechanically deboning animal thighs for separating and collecting meat there from and an apparatus and an alternative apparatus for performing the method, including automated individual processing steps. The processing steps include: grasping a thigh bone of an animal thigh at a hip knuckle with a bone holder; cutting tissue near the hip knuckle; and engaging the thigh bone adjacent the bone holder with a meat stripper. The processing steps further include: moving the bone holder and meat stripper away from one another in a direction substantially coextensive with the longitudinal extend of the thigh bone; allowing the meat stripper to pass over the knee knuckle; and collecting the meat separated from the bone. In particular the method includes and each of the apparatuses perform the process step of cutting tissue adjacent a knee knuckle of the thigh bone, prior to allowing the meat stripper to pass over the knee knuckle. The apparatuses include a plurality of processing stations for carrying out the individual steps, and the processing stations are arranged along a path of convey-
(Continued)

ance defined by a conveyor chain moving through a predefined path.

13 Claims, 19 Drawing Sheets

Related U.S. Application Data continuation of application No. PCT/NL2012/050035, filed on Jan. 20, 2012.

(58) Field of Classification Search
USPC .......................................... 452/135, 136, 138
See application file for complete search history.

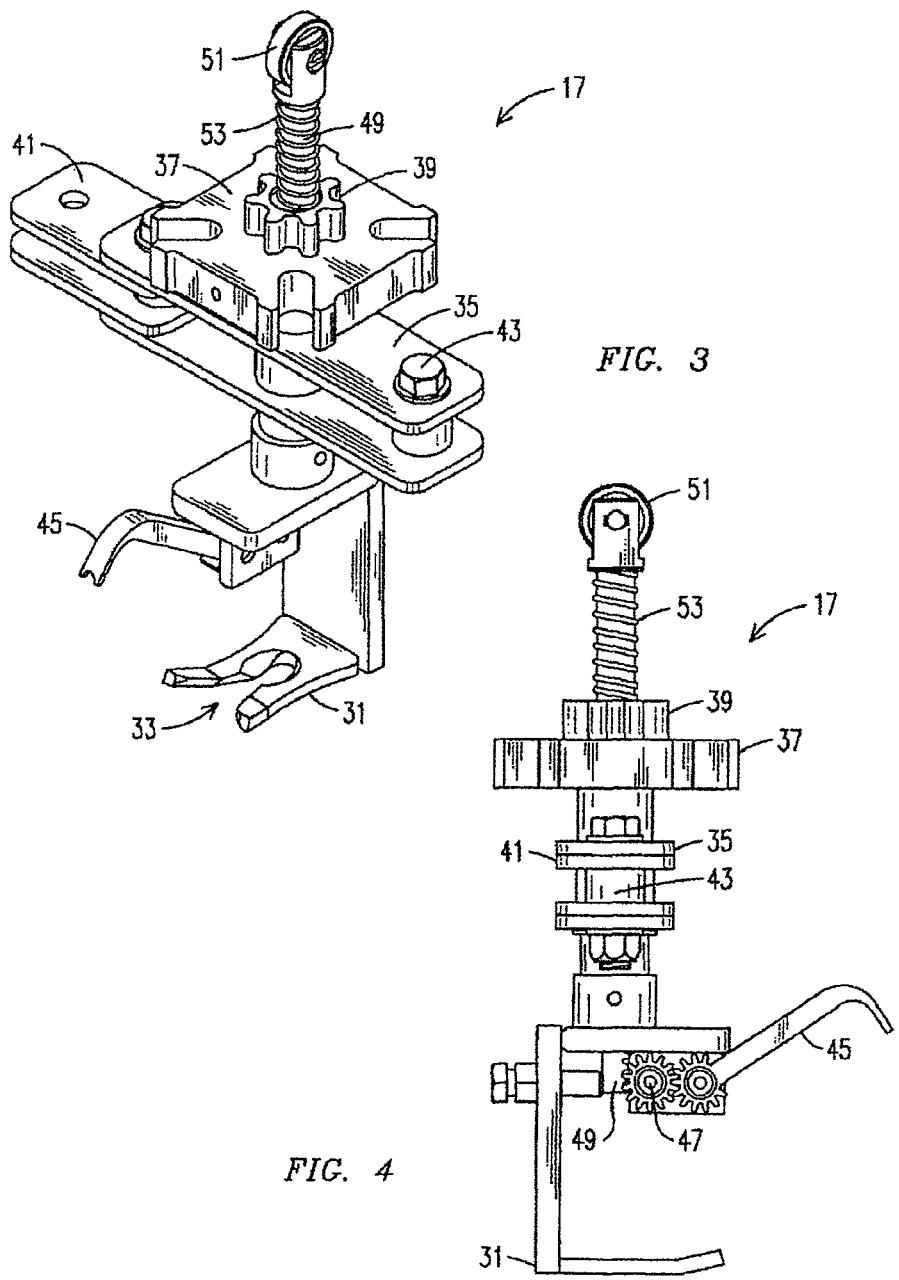

METHOD OF DEBONING ANIMAL THIGHS FOR SEPARATING AND COLLECTING MEAT THEREFROM AND APPARATUS FOR PERFORMING THE METHOD

CROSS-REFERENCE TO RELATED APPLICATIONS

This is a continuation of co-pending application Ser. No. 13/803,156 filed Mar. 14, 2013, which is a continuation of PCT/NL2012/050035, filed Jan. 20, 2012, which claims the benefit of Netherlands Application No. NL2006074, filed Jan. 26, 2011 and Netherlands Application No. NL2007711, filed Nov. 3, 2011, all which are incorporated herein by reference in their entirety.

TECHNICAL FIELD

The invention relates to a method and apparatus for mechanically removing meat from thigh bones encased by said meat. Being able to obtain thigh meat from slaughtered animals, such as poultry or fowl, by mechanical means is of great importance to world food production. It is not uncommon in the food industry to process up to well over a hundred thousand slaughtered birds in a one day's shift.

BACKGROUND

Various methods and apparatuses have been developed for removing thigh meat from thigh bones or femur of poultry and fowl. Generally cut-up lines for bird carcasses can operate at high capacity, but suspend the carcasses from their ankle joints. As a result the legs can thereby only be amongst the last items to be processed. Moreover this manner of suspension is not always ideal in getting the best yield of meat and in preventing contamination by bone fragments. It has therefore become increasingly popular to process thigh meat separately from the traditional cut-up lines, at the disadvantage of having to collect the yet unprocessed thighs and convey and feed these one by one to a dedicated processing device. Part of this drawback has been overcome in that one or a plurality of such thigh processing devices can be operated simultaneous to a cut-up line. Such dedicated thigh deboning devices, as disclosed for example in U.S. Pat. No. 3,510,908, are often relying on manual labour, can be cumbersome to operate, and clearly do little to increase processing speed.

Accordingly it is an object of the present invention to propose an improved method and apparatus for deboning animal thighs for separating and collecting meat from the thigh bone. In a more general sense it is an object of the invention to overcome or ameliorate at least one of the disadvantages of the prior art. It is also an object of the present invention to provide alternative structures which are less cumbersome in assembly and operation and which moreover can be made relatively inexpensively. Alternatively it is an object of the invention to at least provide the public with a useful choice.

SUMMARY

To this end the invention provides a method of deboning animal thighs for separating and collecting meat there from and an apparatus for performing the method, as defined in one or more of the appended claims. The method according to the invention includes automated individual processing steps of: grasping a thigh bone of an animal thigh at a hip knuckle with a bone holder; cutting tissue near the hip knuckle; and engaging the thigh bone adjacent the bone holder with a meat stripper. The processing steps further include: moving the bone holder and meat stripper away from one another in a direction substantially coextensive with the longitudinal extend of the thigh bone; allowing the meat stripper to pass over the knee knuckle; and collecting the meat separated from the bone. In particular the method includes and the apparatus performs the process step of cutting tissue adjacent a knee knuckle of the thigh bone, prior to allowing the meat stripper to pass over the knee knuckle. The apparatus includes a plurality of processing stations for carrying out the individual steps, and the processing stations are arranged along a path of conveyance defined by a conveyor chain moving through a predefined path. Such method and apparatus enables the animal thigh to be hung from their hip knuckles, rather than suspending the entire leg from an ankle knuckle or the thigh from its knee knuckle. It has been found that stripping the meat from a thigh bone gives the best yield when stripping from the hip knuckle in the direction of the knee knuckle. Also the cutting of knee knuckle related tissue prior to stripping the meat of the bone improves the yield and the quality of the meat. In this way the sleeve of meat is also not turned inside-out when it has to pass the last knuckle to which it is still attached before it is cut lose, as is the case with the prior art methods and apparatuses.

The aspects as covered by the appended claims as well as other aspects, features and advantages of the invention will be explained in further detail in the description below in reference to the accompanying drawings, which are briefly described as follows.

BRIEF DESCRIPTION OF THE DRAWINGS

FIG. 3 is a perspective view of a bone holder for use with the invention;

FIG. 4 is a side elevation of the bone holder of FIG. 3;

DETAILED DESCRIPTION

Figure 1:
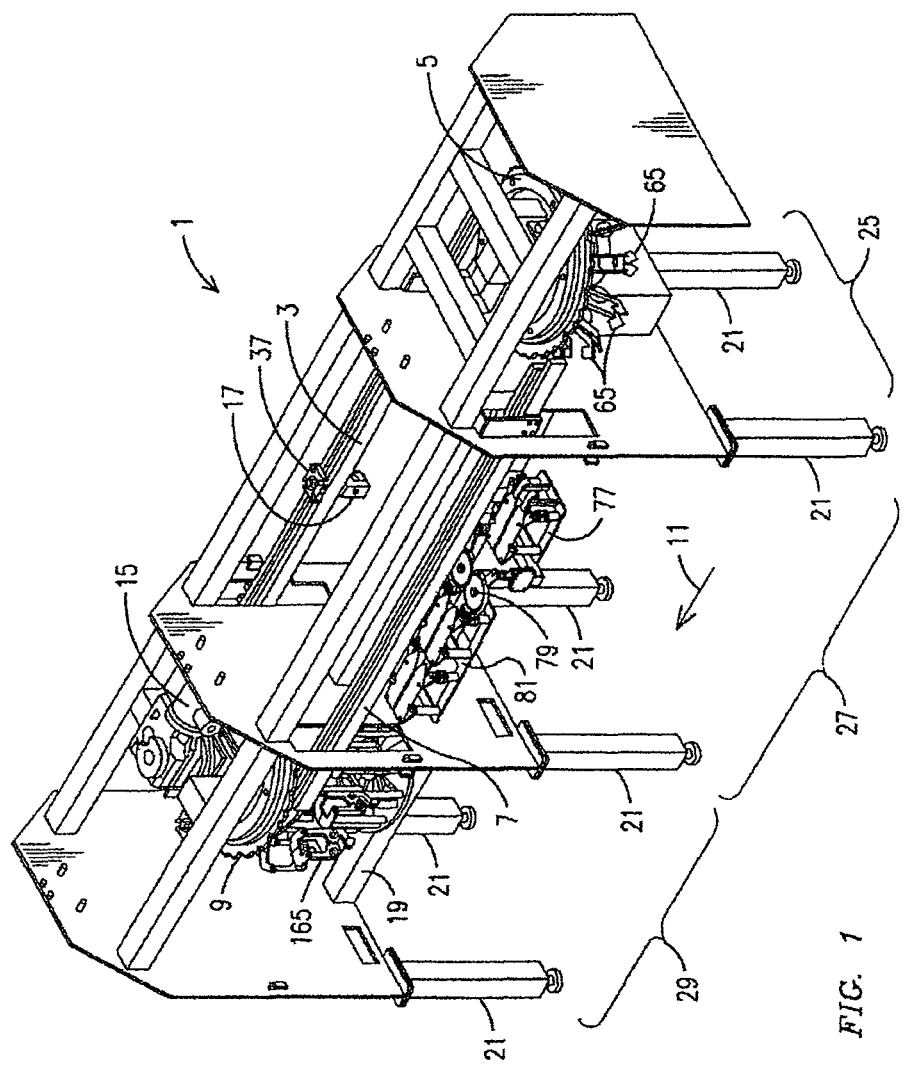
FIG. 1 is a bird's eye perspective view of the apparatus according to and for performing the method of the invention from a first direction.
Figure 2:
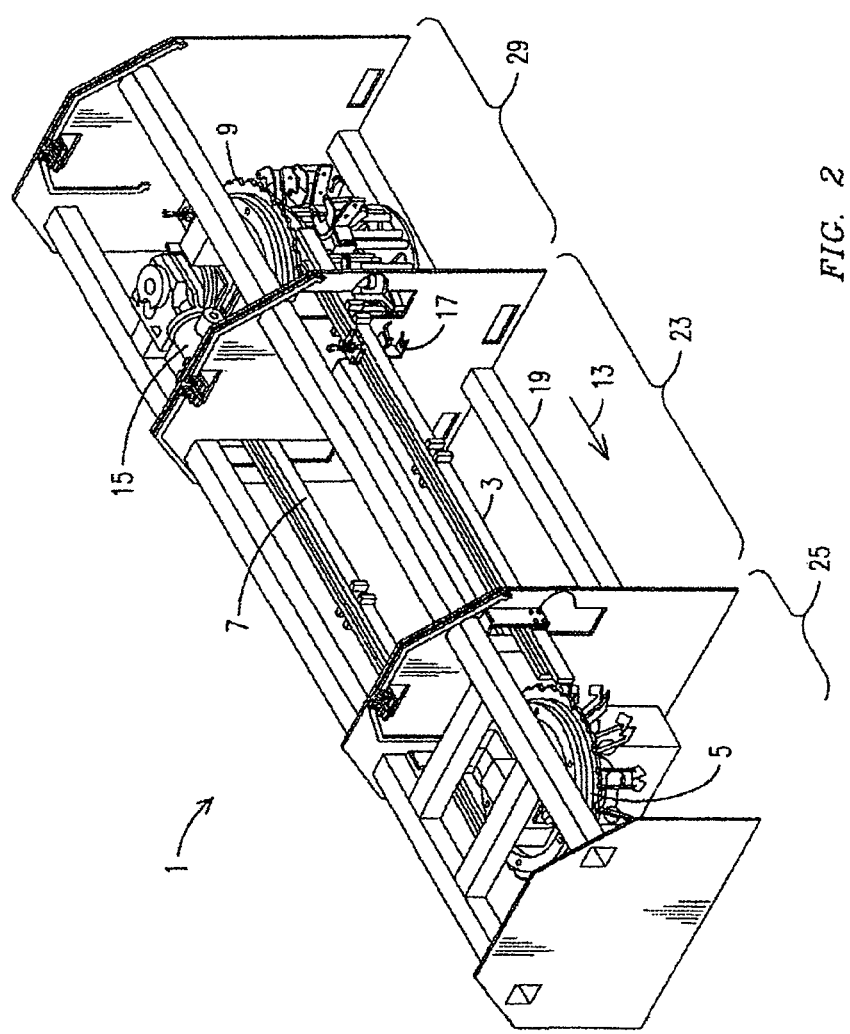
FIG. 2 is a bird's eye perspective view of the apparatus of FIG. 1 from a second direction.

In FIGS. 1 and 2, bird's eye perspective views are shown of opposite sides of an apparatus 1 for performing the method of the invention. The apparatus 1 has an overhead conveying means that is defined by a first linear conveyor section 3, a first carousel 5, a second linear conveyor section 7 and a second carousel 9. The overhead conveying means include conveyor chain (not shown but conventional) that is arranged for movement in the direction of arrows 11 (FIG. 1) and 13 (FIG. 2). The conveyor chain is driven for movement by the second carousel 9 that is provided for this purpose with an electric drive motor 15 that may drive the carousel 9 through a gear reduction. The first carousel 5 is mounted for idle rotation and is driven indirectly by the conveyor chain, as is conventional for such overhead conveying systems for moving article hangers, such as bone holder 17, through a processing path. All the basic elements described thus far are mounted on an apparatus or machine frame, generally indicated with reference numeral 19, which can be supported by legs 21 (only shown in FIG. 1) to be at a convenient height. In the direction of movement of the conveying means, the apparatus 1, in accordance with the direction of movement of arrows 11 and 13, can be distinguished by a loading section 23 (FIG. 2), a first tissue cutting section 25, a second tissue cutting section 27 and a meat stripping and discharge section 29.

As seen in FIG. 2, at the loading section 23, the bone holder 17 is presented with a bifurcated receiving end opening to the exterior of the apparatus 1. The bone holder 17 is illustrated in more detail in FIGS. 3 and 4, to which reference is made for a more detailed description of the bone holder. While only one bone holder 17 is shown in FIGS. 1 and 2, for clarity, it is to be understood that a plurality of such bone holders will be present and spaced at regular intervals along the overhead conveyor. Such arrangements are in themselves conventional and require no further explanation. The bone holder 17 as shown in FIG. 3 is provided with a bifurcated receiving end 31, which defines a receiving slot 33 for receiving and supporting the hip knuckle (caput femoris) of the thigh bone (femur), with the knee knuckle (condylus) hanging substantially vertically downwardly. The receiving end 31 of the bone holder 17 is rotatably received in bone holder shackle 35 by a hollow central shaft, which is connected for rotation by a turning gear 37. Also connected to the hollow central shaft for rotation of the receiving end 31 is a gear pinion 39. The hollow shackle 35, together with several others and intermediate shackles 41, connected by bolts 43, form the conveyer chain. The bone holder 17 is provided with a swivelable locking arm 45. This swivelable locking arm 45 is mounted for swivelling from an open position, as shown in FIGS. 3 and 4, to a locking position in which it will engage in the receiving slot 33 to prevent a thigh bone engaged in the receiving slot 33 to escape there from. Swivelling of the locking arm 45 is effected through an intermediate pinion 47 which is driven by a toothed pusher rod 49 that extends through the hollow central shaft of the bone holder 17. Pusher rod 49 at its upper end carries a cam follower 51, which in use is positioned to be engaged by a cam track of the apparatus (not shown, but conventional). A compression spring 53 urges the pusher rod 49 upwardly and thereby biases the locking arm to its open position.

Figure 5:
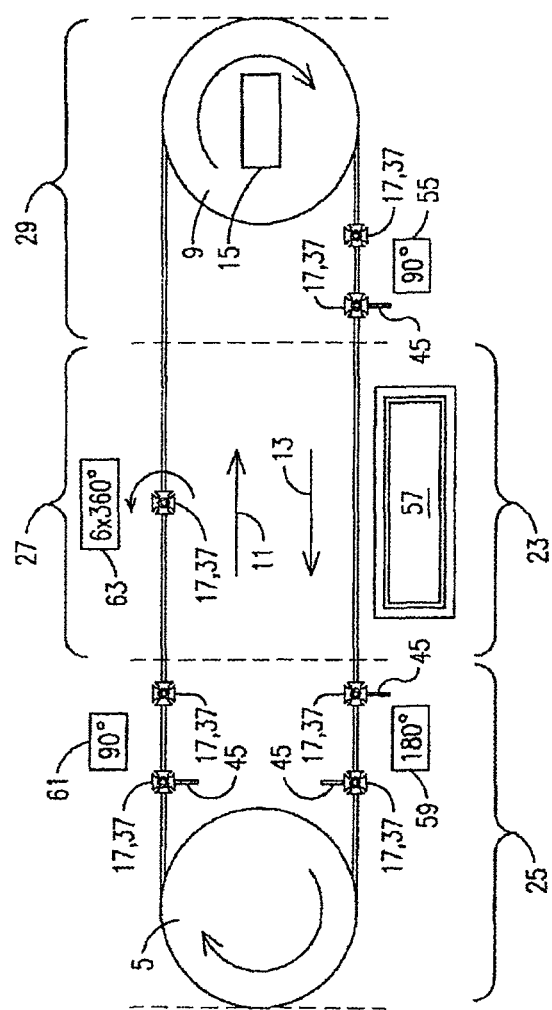
FIG. 5 is a schematic top plan view of the apparatus of FIGS. 1 and 2.

FIG. 5 schematically shows the rotational movements of the bone holder along the processing or conveying path through the apparatus. The bone holders 17 are indicated by their turning gears 37, only at the locations about the conveying loop, where their rotational position is changed. In the actual apparatus there can be many more bone holders, but these are deleted in the schematic representation of FIG. 5 for clarity sake. Schematically indicated by numeral 55 is a first turning station, which readjust the bone holders 17 returning from the second carousel 9 through 90° before these enter the loading section 23. This positions the receiving slots, so that these face a loading platform 57, where an operator may manually insert the fowl or poultry thighs into the bifurcated receiving ends of the respective bone holders 17. The concept of a turning station, such as 55 is conventional and well known in the art. To avoid unnecessary repetition, reference can be had to the disclosure of EP 0 786 208 for a further description of such a turning station that generally uses one or more protrusions engaging the diagonal slots at the corner points of the turning gear 37 of the bone holders 17. Upon having left the loading section 23, the bone holders 17 are turned through 180° by a further, second turning station 59. Thereby the receiving slots 33 (FIG. 3) are turned inwardly before entering the first carousel 5, where these slots will be facing toward the axis of rotation of the first carousel. Upon leaving the first carousel 5 and before entering the second tissue cutting section 27, the bone holder 17 is again turned through 90° in a counter clockwise direction by a third turning station 61. After turning by the third turning station 61, the receiving slot 33 (FIG. 3) will be leading in the direction of movement (arrow 11). Then in the second tissue cutting section 27 the bone holder 17 will engage rotation station 63, in which its pinion gear 39 engages a toothed rack by which it is rotated through six full revolutions of 360°, while it is at the same time advanced by the conveyer chain.

While at the loading section 23 (FIGS. 2 and 5), the bone holder 17 is positioned to face with the open end of its receiving slot 33 toward the loading platform 57. In this position an animal thigh may be positioned by an operating person to be grasped by the bifurcated receiving end 31 (see FIG. 3) at the thigh bone shaft adjacent the hip knuckle (caput femoris). Preferably the animal thigh is also positioned with the front part of the knee knuckle facing the operator at the loading platform 57. Up to its transition past the first carousel 5, the swivelable locking arm 45 will remain in its open position. Upon leaving the first carousel 5 and in association with the third turning station 61, the locking arm 45 is moved into its locking position by urging the cam follower 51 downwardly against the compressing spring 53 (FIG. 3). This can be effected by an overhead cam track positioned to engage the cam follower 51. By this movement the pusher rod 49 will swivel the locking arm 45 via the intermediate pinion 47 into its locking position. The bone holder 17 will retain this locked position up to its transition through the second carousel 9, and it will be allowed to open again by the cam track, to release the thigh bone just prior to passing again the first turning station 55.

Brief reference will now be made to FIG. 6, which shows the first carousel that forms the first tissue cutting section 25 in a partial side elevation looking from the side of the apparatus 1 where the loading section 23 is located. For clarity the cutting means have been deleted from FIG. 6. The first carousel 5 is rotatably suspended from the machine frame 19. The linear conveyer section 3 joins the first carousel 5 in a radial direction, so that each bone holder (not shown in FIG. 6) becomes associated with a relevant one of a plurality of pivotable knee end supports 65. The knee end supports 65 rotate with the first carousel 5 and are each provided with a guide roller 67 for controlling the pivotal position of the knee end support as will be explained herein below.

Figure 6:
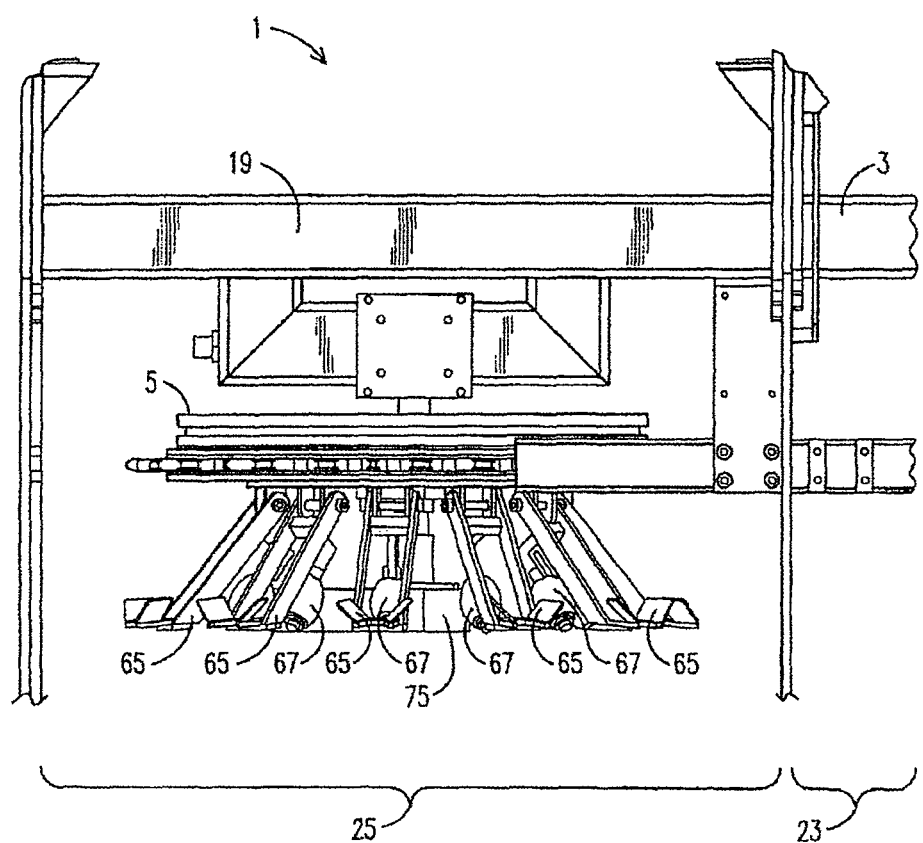
FIG. 6 is a partial side elevation of a first tissue cutting section of the apparatus of FIGS. 1 and 2.
Figure 7:
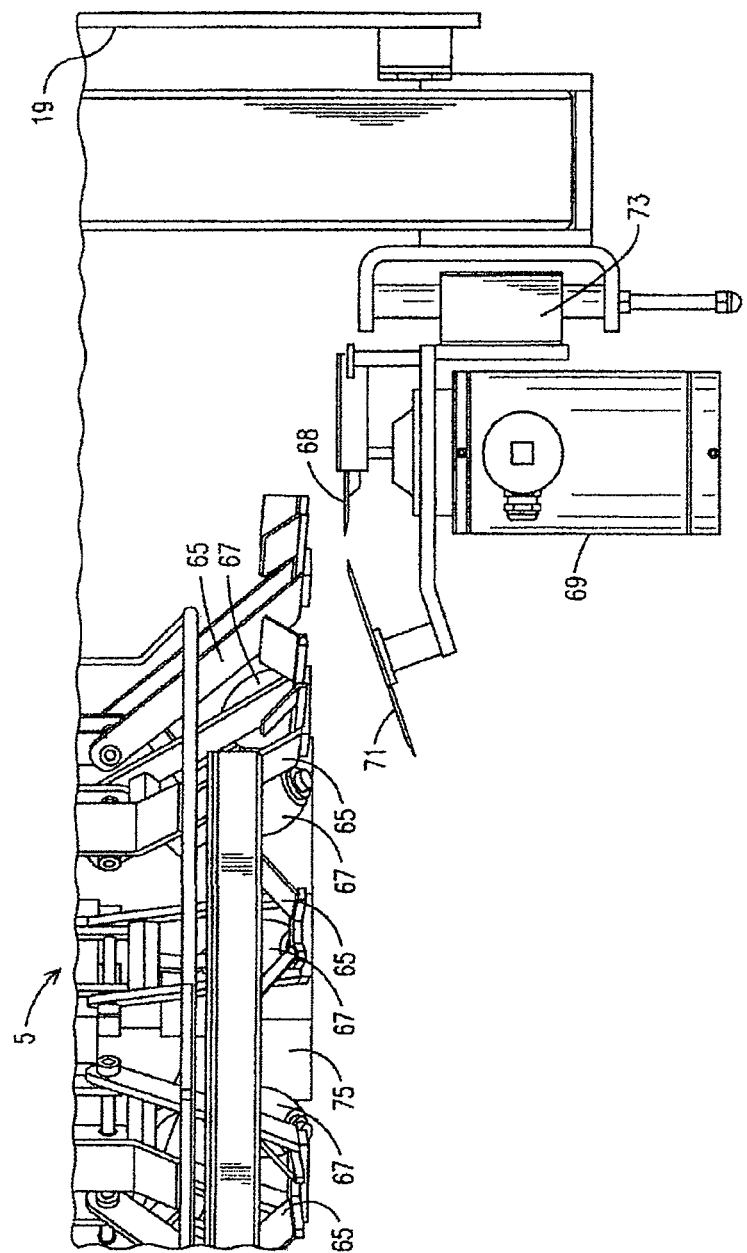
FIG. 7 is a detail view of the first tissue cutting section of FIG. 6 viewed from an opposite direction.

FIG. 7 is a partial view, opposite from the direction of FIG. 6 of a detail of the first carousel, but now showing the cutting means, comprised of a circular rotating cutting blade 68 in position relative to the first carousel 5 and the knee end supports 65. Rotating cutting blade 68 is rotated by an electric motor unit 69. The rotating cutting blade 68 is confronted by a further circular cutting blade 71 that is mounted for idle rotation on the electric motor unit 69. The entire electric motor unit 69 with its rotatable cutting blades 68, 71 is height adjustably mounted on the machine frame 19 by a screw adjustment device 73. The pivotable knee end supports 65 assists in positioning the individual knee ends of the animal thighs for passage between the opposed circular cutting blades 68, 71. The knee end supports 65 by moving the knees of the animal thighs radially outwardly of the first carousel 5 also ensure that there is sufficient spacing between successive knee portions, even when the thighs are suspended from a narrow pitch conveyor chain. A narrow pitch conveyor chain may be used to reduce the floor space required for the machine and/or to increase its throughput.

Figure 8:
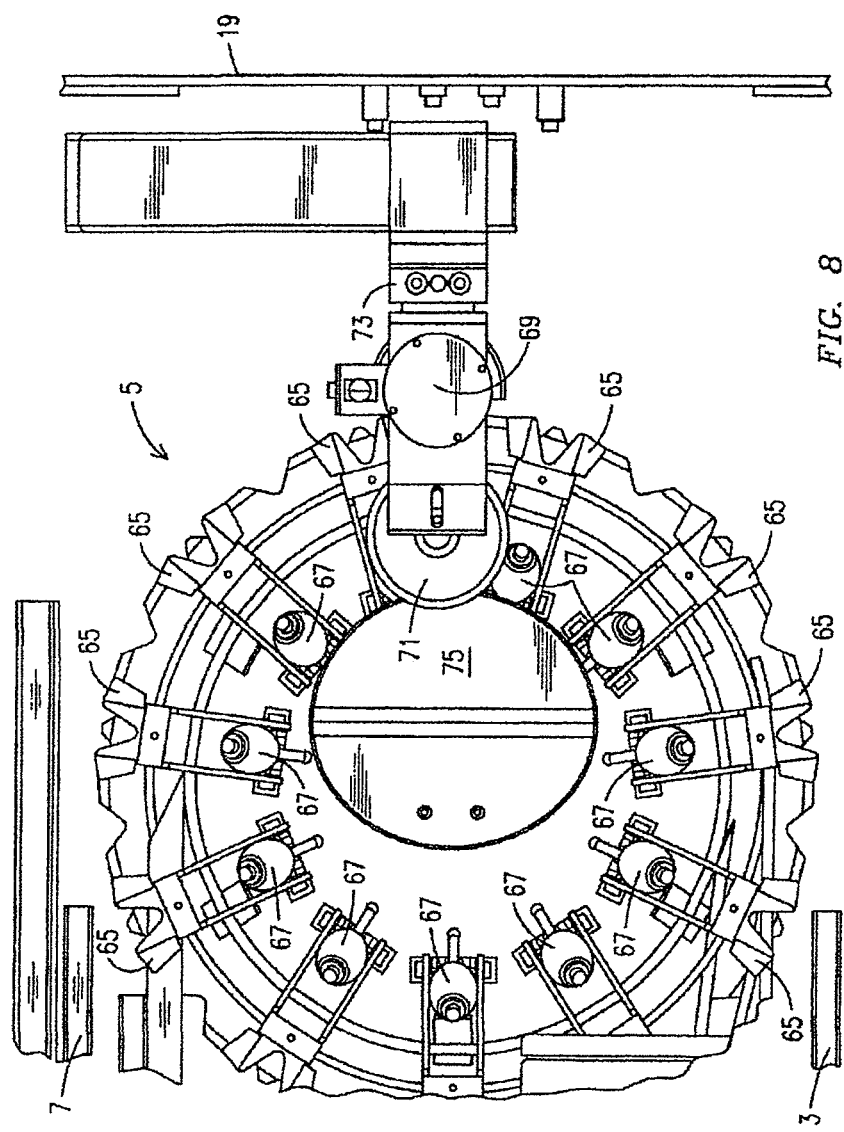
FIG. 8 is a plan view from below of the cutting section of FIGS. 6 and 7.

In FIG. 8 an arrangement is shown for pivoting the individual knee supports 65 in respect of the cutting means. FIG. 8 is a view of the first carousel 5 as seen vertically upward from below. In this view it is possible to recognise a stationary excenter 75 that urges the guide rollers 67 and thereby the pivotable knee end supports in a predetermined position with respect to the cutting blades 68, 71 on the motor unit 69. The predetermined position is such that the front and back portion of the bone shaft directly adjacent to the knee knuckle passes between the cutting blades 68, 71 for cutting tissue that connects the meat to the bone. Thereby, such tissue is severed that is positioned adjacent the front and back of the knee knuckle end of the thigh bone.

Figure 9:
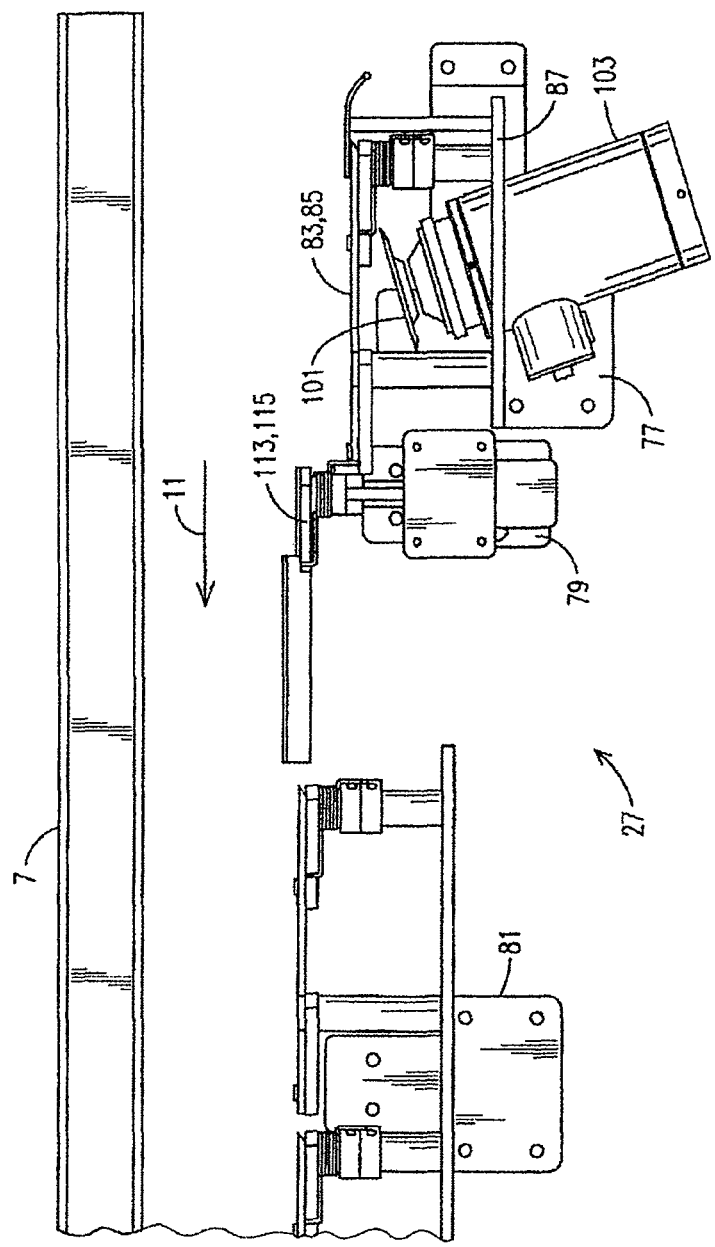
FIG. 9 is a partial side elevation of a second tissue cutting section of the apparatus of FIGS. 1 and 2.
Figure 10:
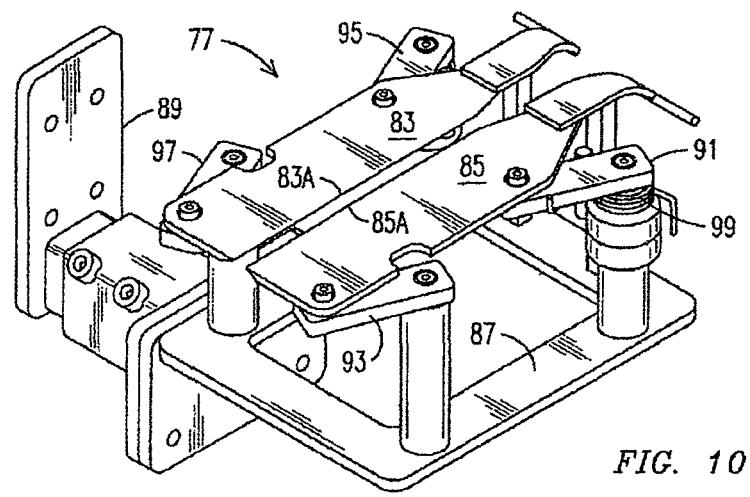
FIG. 10 is a perspective view of a first cutting station for use in the second tissue cutting section of FIG. 9.

From the first carousel 5 the bone holders 17 will advance along the overhead conveyor to the second linear section 7, after being turned by the third turning station 61 anti-clockwise through 90°. This turning movement positions the receiving slot 33 with its opening in the direction of conveyance but as explained above, the locking arm 45 will now also have moved into its closed position in which it is engaged in the receiving slot 33 of the bifurcated receiving end 31. In this position and with the locking arm 45 closed, the bone holders 17 progress through the second tissue cutting section 27. A close-up detail of the second tissue section 27 is shown in FIG. 9. For a description of the second tissue section 27, reference can also be had again to FIG. 1. While progressing through the second tissue cutting section 27 in the direction of arrow 11, an animal thigh suspended from one of the bone holders 17 successively passes a first cutting station 77, a second cutting station 79 and a third cutting station 81. The first cutting station 77 as shown in more detail in FIG. 10 includes first and second parallel knife blades 83, 85. Each of the first and second knife blades 83, 85 is mounted on a supporting frame 87 that is mounted to the machine frame 19 by means of a mounting flange 89. The first and second knife blades 83, 85 are each pivotally linked to one of a first and second pair of substantially parallel pivoting arms 91, 93 and 95, 97 respectively. Of each pair of arms 91, 93, respectively 95, 97, at least a first one 91, 95 is provided with a torsion spring 99 that biases the knife edges 83A, 85A toward the centre of the path of conveyance. The first cutting station 77 is positioned at a level with respect to the second linear conveyor section 7 to engage tissue adjacent the knee knuckle of an animal thigh passing between the opposite knife edges 83A, 85A. Because the animal thigh has been rotated through 90°, the knife edges 83A, 85A engage tissue that connects the meat to the bone at opposite side portions of the bone shaft adjacent the knee knuckle. This part of the tissue has not yet been severed by the first tissue cutting section 25. It is further seen in FIG. 9 that the first cutting station 77 is also associated with a rotation cutting blade 101, driven by motor unit 103. The rotating cutting blade 101 is positioned below the parallel knife blades 83, 85 at a level to remove any excess matter below the knee knuckle, such as parts of the lower leg (tibiotarsus) that may have resulted from imperfections in previous poultry or fowl processing machines for obtaining the animal thighs. The frame 87 of the first cutting station 77 is provided with a large cut-out through which the rotating cutting blade 101 and part of the motor unit 103 may extend. Preferably height adjustment is additionally provided to fine tune the operation of the machine.

Figure 11:
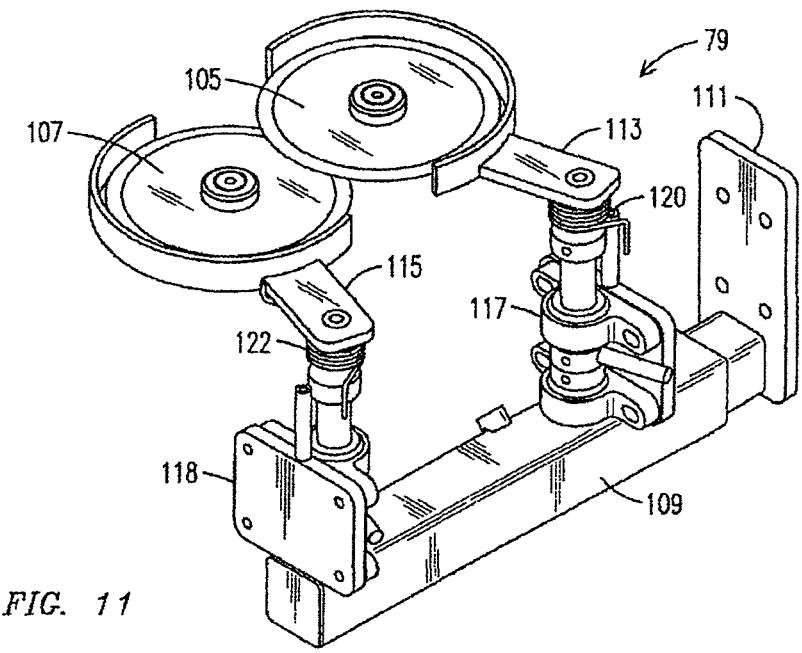
FIG. 11 is a second cutting station for use in the second tissue cutting section of FIG. 9.

In FIG. 11 the second cutting station 79 is shown in more detail than in FIG. 9. The second cutting 79 is positioned at a level with respect to the second linear conveyor section 7 to engage tissue near the hip knuckle of an animal thigh. To this end the second cutting station 79 has opposite first and second rotatable knife blades 105, 107, which are not driven. The non-driven knife blades 105, 107 can be either stationary or idle to rotate upon engagement with animal tissue. However, when mounted for idle rotation, the rotation of the knife blades 105, 107 is preferably provided with a certain amount of drag, so as not to compromise the cutting action. The first and second rotatable knife blades 105, 107 are each pivotally mounted from a supporting frame 109 that has a mounting plate 111 for attachment to the machine frame 19. Both first and second rotary knife blades 105, 107 are biased to interfere with the path of conveyance through which the animal thighs are advanced. Each of the first and second rotary knifes 105, 107 is mounted from a respective first or second swivel arm 113, 115, each carried on shafts rotatable in bearing blocks 117, 118. Biasing of the rotatable knife blades 105, 107 to overlap at the centre of the path of conveyance is obtained by respective first and second torsion springs 120, 122 that urge the arms 113, 115 inwardly.

Figures 12, 14:
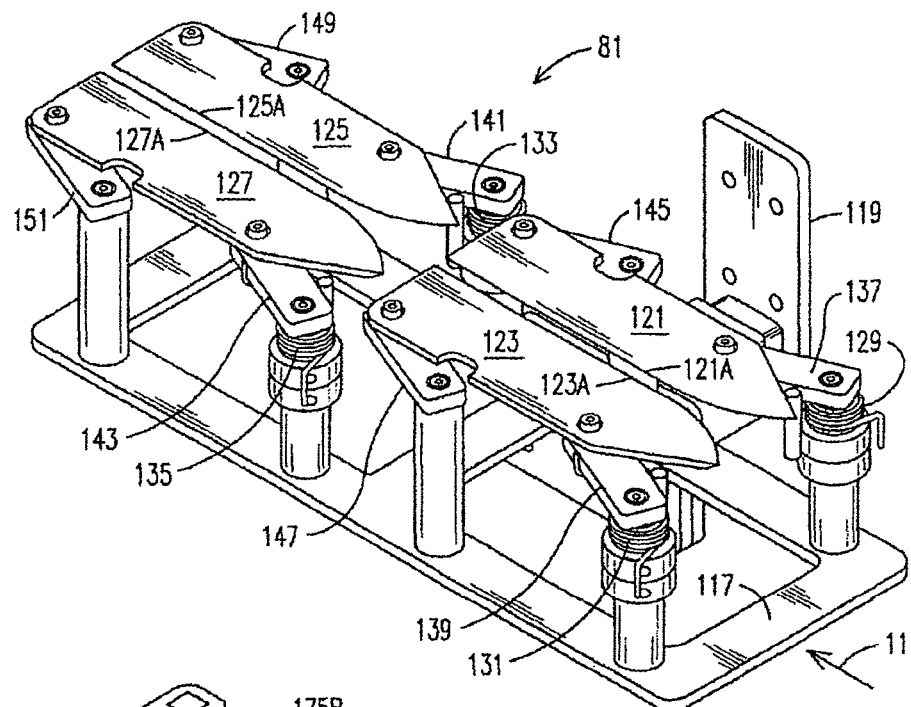
FIG. 12 is a third cutting station for use in the second tissue cutting section of FIG. 9.
FIG. 14 is a meat stripper unit for use in the meat stripping and discharge section of FIG. 13.

In FIG. 12 the third cutting station 81 is shown in more detail. The third cutting station 81 includes a supporting frame 117 cantilevered from a mounting plate 119 for attachment to the machine frame 19. Supported by the support frame 117 are a first pair of opposing knife blades 121, 123 and a second pair of opposing knife blades 125, 127. Confronting knife edges 121A, 123A and 125A, 127A of each first and second pair of opposing knife blades are biased towards the centre of the path of conveyance by torsion springs 129, 131, 133, 135, acting on at least one of respective arms 137, 139, 141, 143 of the pairs of pivoting arms. The respective pairs each have a relevant further arm 145, 147, 149, 151 that is mounted for idle rotation about a vertically extending axis. With the arrangement of each knife blade being pivotally connected to a pair of substantially parallel pivoting arms the knife blades each remain generally parallel to the path of conveyance, but still have some freedom to deviate from the parallel position when the hip bone of an animal thigh passes there between. The knife edges 121A, 123A, 125A, 127A of the first and second parts of opposing knife blades are positioned with respect to the second linear conveyer section 7 at a level to engage tissue near the hip knuckle that connects the meat of an animal thigh to the bone shaft. When entering the first pair of opposing knife blades 121, 123 in the direction of the arrow 11, the animal thigh will be rotated about an axis substantially coextensive with the longitudinal extent of the thigh bone shaft between its opposite end protuberances formed by the hip and knee knuckles. This rotation is induced by the bone holder 17 being rotated by rotation station 63, which includes a toothed rack engaging gear pinion 39 (not shown, but conventional). While passing through the first and second pairs of opposing knife edges 121A, 123A, 125A, 127A, juxtaposed in a downstream direction, the animal thigh is rotated through six full revolutions of 360° to ensure that all tissue connecting the meat to the hip bone adjacent the hip knuckle is severed. It should be clear to the skilled person that other arrangements of the third cutting station are also possible. One such possibility is the use of only a single pair of opposing knife edges, which then would each have a longer length. Other variations may be sought in the number of revolutions through which the bone holder 17 is rotated. Nonetheless, good results have been achieved with the example as described, especially in combination with a more compact narrow pitch conveyor system, using an eight inch, rather than the more common twelve inch pitch, between the suspended animal thighs.

Figure 13:
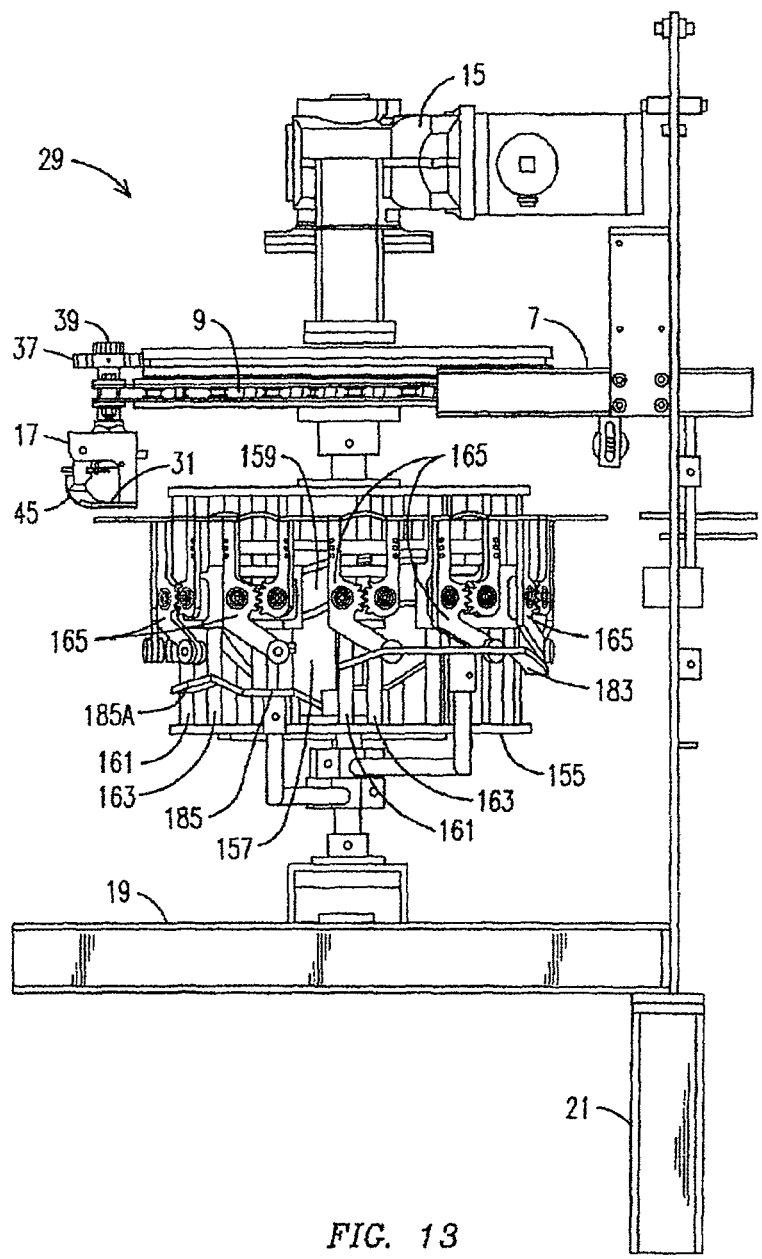
FIG. 13 is a partial side elevation of a meat stripping and discharge section of the apparatus.

In FIG. 13 a partial side elevation is shown of the meat stripping and discharge section 29. The meat stripping and discharge section 29 includes the second carousel 9 that receives the bone holders 17 from the second linear conveyer section 7 after these have been advanced through the second tissue cutting section 27. The second carousel 9 is driven by the electric drive motor 15 and rotates together with cage 155. The cage 155 can turn around a stationary cam drum 157 which is provided with a cam track 159. The rotating cage 155 includes a plurality of pairs of bars 161, 163 allowing vertical movement there along of meat stripper units 165. The meat stripper units will now be further explained in reference to FIGS. 13 and 14. When reference is had to FIG. 14 it will be apparent that the meat stripper unit 165 has a sliding block 167, with a pair of vertically extending bores 169 (only one of which is visible in FIG. 14), for accommodating the pair of bars 161, 163 of the rotating cage 155. At the rear of sliding block 167 there is provided a guide roller 171 that in use engages the cam track 159 of the stationary cam drum 157. At the front of the sliding block 167 are positioned a first pivotable gripper arm 173 and a second gripper arm 175. The first and second gripper arms engage one another through gear toothed segments 173A, 175A. Thereby the pivoting movement of the gripper arms 173, 175 and respective gripper plates 173B, 175B is synchronised to move away from the closed position shown in FIG. 14 in equal amounts. The gripper plates 173B, 175B are urged toward the closed position by a pull spring 177. The second gripper arm 175 has an arm extension 179 that carries a cam follower wheel 181 at its distal end. The cam follower wheel 181 is positioned to engage perimeter cam track sections 183, 185 that extend about the rotating cage 155 as shown in FIG. 13. The cam track sections 183, 185 are stationary with respect to the rotating cage 155. A first one of the cam track sections 183 is positioned to urge the gripper plates 173B, 175B to the open position to engage a thigh hanging from an adjacent bone holder 17 at the thigh bone directly below the bifurcated end 31 of the bone holder 17. At a downstream end of the one cam track section 183, the cam track 159 of the stationary cam drum 157 will move the meat stripper unit 165, with the gripper plates 173B, 175B closed around the bone shaft, in a vertically downward direction, by means of the guide roller 171. During this downward movement and the meat stripper unit's progress in the second carousel, the other of the cam track sections 185 will engage the cam follower roller 181 with an upwardly directed hump 185A and thereby slightly open the gripper plates 173B, 175B to pass over the knee knuckle of the thigh bone. Because the tissue holding the meat to the knuckle region of the thigh bone has already been severed sufficiently, the continued downward movement of the meat stripper unit 165 will completely remove the meat from the thigh bone. This removed meat may then be collected by gravity in a collecting tray or alternatively by a collecting conveyer placed underneath the second carousel 9 of the meat stripper and discharge section 29. After removal of the meat, the bone holders 17 continue their movement around the second carousel 9 and the locking arm 45 will be allowed to open again for release of the thigh bone from which the meat has been removed. Suitable means may additionally be provided to collect the discharged thigh bones, such as trays or conveyors.

Figure 15:
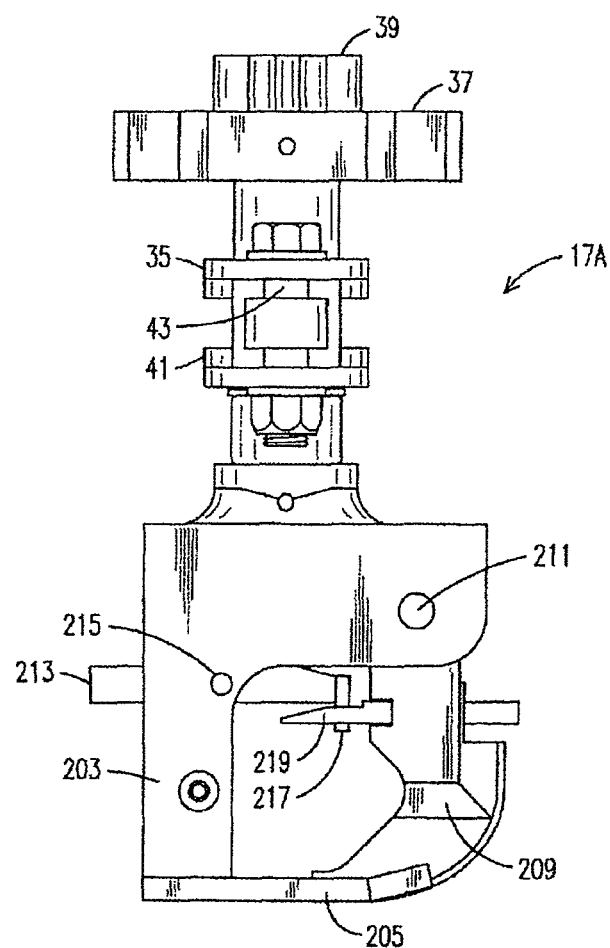
FIG. 15 is a side elevation of an alternative form of bone holder.
Figure 16:
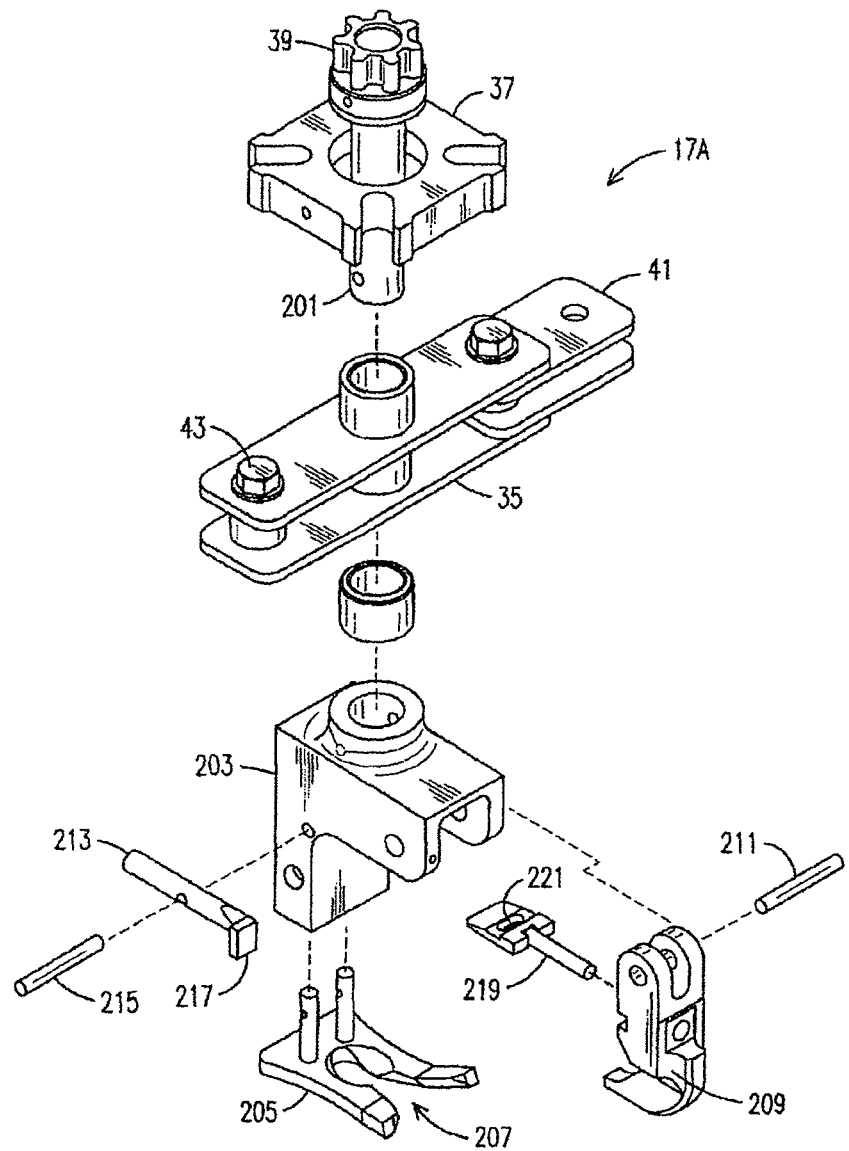
FIG. 16 is a perspective exploded view of the alternative form of bone holder of FIG. 15.

An alternative form of bone holder 17A is shown in FIG. 15 in side elevation, whereas FIG. 16 is a perspective exploded view of the same alternative form of bone holder. Because the upper portion of the bone holder 17A is largely similar to that described in reference to FIGS. 3 and 4, the same reference numerals have been used to denote the bone holder shackle 35, the turning gear 37, the gear pinion 39, the intermediate shackle 41, and the connecting bolts 43. Depending from a pinion shaft 201, which extends through the bone holder shackle 35 is a receiving block 203, to which is mounted a bifurcated receiving end 205. The bifurcated receiving end 205 has a receiving slot 207, for receiving the hip joint protrusion of an animal thigh hip bone (femur). Pivotally mounted to the receiving block 203 is a swivelable locking arm 209 that pivots about a first pivot pin 211. The swivelable locking arm 209 is biased to an open position by a torsion spring (not shown, but conventional). In FIG. 15 the swivelable locking arm 209 is shown in its closed position, which closed position is held by a pivotable latch arm 213 mounted from a second pivot pin 215. The latch arm 213 has a downwardly extending detent 217 that in FIG. 15 is shown engaging an aperture 221 in a latch gripper 219. The latch gripper 219 can be adjustably attached to the locking arm 209, to thereby determine the position of closure of the locking arm 209 and take into account variations in bone shaft thicknesses. Closing of the locking arm 209 is effected by a cam track means (not shown, but conventional) acting directly on the locking arm, upon passing and engaging the cam track means. In difference to the bone holder of FIGS. 3 and 4, the bone holder 17A of FIGS. 15 and 16 locks itself in the closed position, so that it is not necessary to keep it engaged by a cam track for as long as the locking arm 209 needs to be closed. Conversely only a further cam track means is needed to unlatch the locking arm 209 to cause the latch arm 213 to lift the detent 217 from the latch gripper 219 and thereby allow the locking arm 209 to swivel to its open position to which it is normally biased. The latch arm can be actuated by a cam track that is positioned to depress the exposed end of the latch arm 213 and cause it to pivot about the second pivot pin 215. This arrangement has the benefit of reducing friction and wear in the operation of the apparatus, by avoiding cam track followers (such as 51 of bone holder 17), to be in prolonged engagement with a cam track. The modified bone holder 17A, also results in a reduction of raw materials, such as stainless steel, necessary in the construction of a deboning apparatus.

Figure 17:
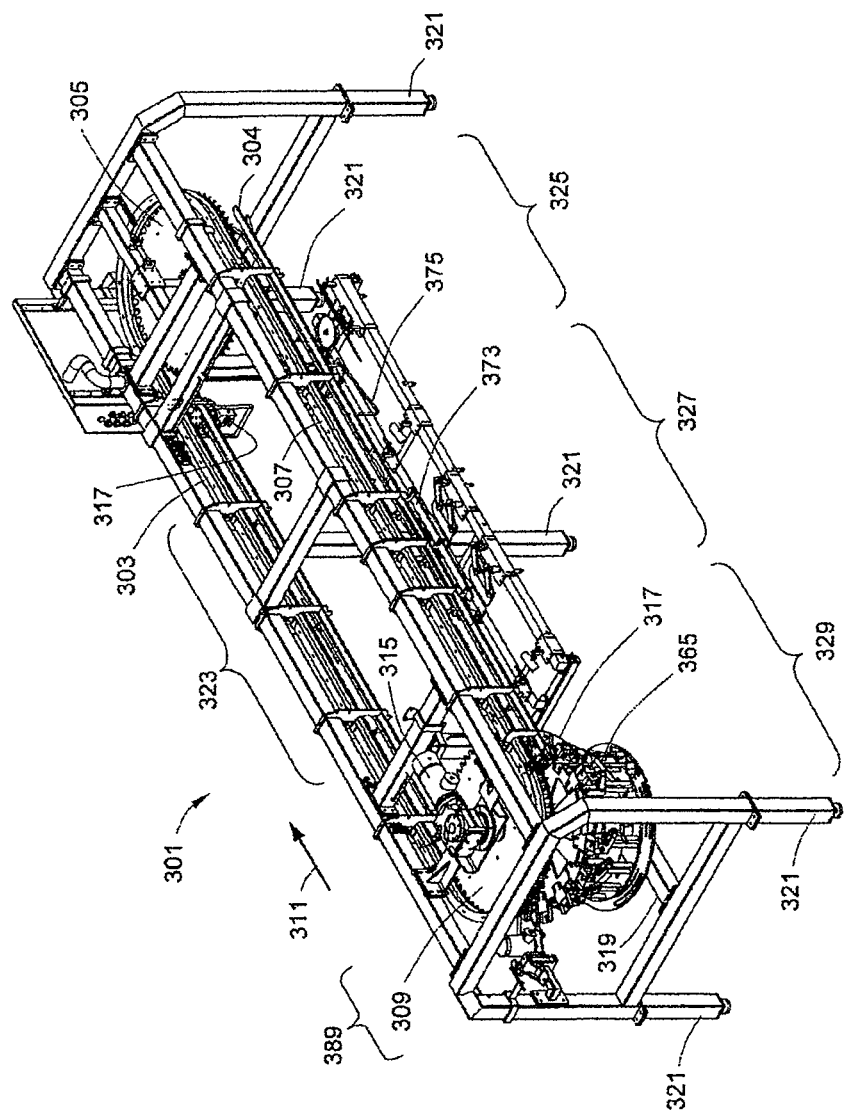
FIG. 17 is a bird's eye perspective view of an alternative form of the apparatus according to and for performing the method of the invention.
Figure 22:
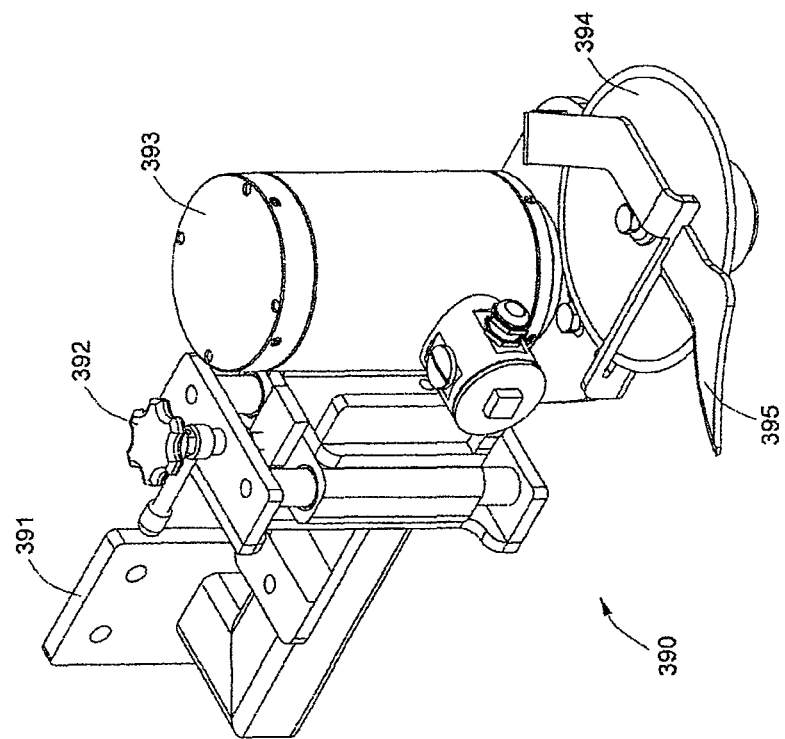
FIG. 22 is a perspective view of the cutting station of the third tissue cutting section.

In FIG. 17, a bird's eye perspective view of an alternative apparatus 301 for performing the method of the invention is shown. As in the previous embodiment the apparatus 301 has an overhead conveying means that is defined by a first linear conveyor section 303, a first carousel 305, a second linear conveyor section 307 and a second carousel 309. The overhead conveying means includes a conveyor chain (not shown but conventional) that is arranged for movement in the direction of arrow 311. The conveyor chain is driven for movement by the second carousel 309 that is provided for this purpose with an electric drive motor 315 that may drive the carousel 309 through a gear reduction. The first carousel 305 is mounted for idle rotation and is driven indirectly by the conveyor chain, as is conventional for such overhead conveying systems for moving article hangers, such as bone holder 317, through a processing path. All the basic elements described thus far are mounted on an apparatus or machine frame, generally indicated with reference numeral 319, which can be supported by legs 321 to be at a convenient height. In the direction of movement of the conveying means, the apparatus 301, in accordance with the direction of movement of arrow 311, can be distinguished by a loading section 323, a first tissue cutting section 325, a second tissue cutting section 327 and a meat stripping and discharge section 329 incorporating a third tissue cutting section 389. The latter will be explained in more detail in reference to FIG. 22.

At the loading section 323, the bone holder 317 is presented with a bifurcated receiving end 331 opening to the exterior of the apparatus 301. The bone holder 317 is illustrated in more detail in FIGS. 18 and 19. While only two bone holders 317 are shown in FIG. 17, for clarity, it is to be understood that a plurality of such bone holders will be present and spaced at regular intervals along the overhead conveyor. Such arrangements are in itself conventional and require no further explanation.

Figure 18:
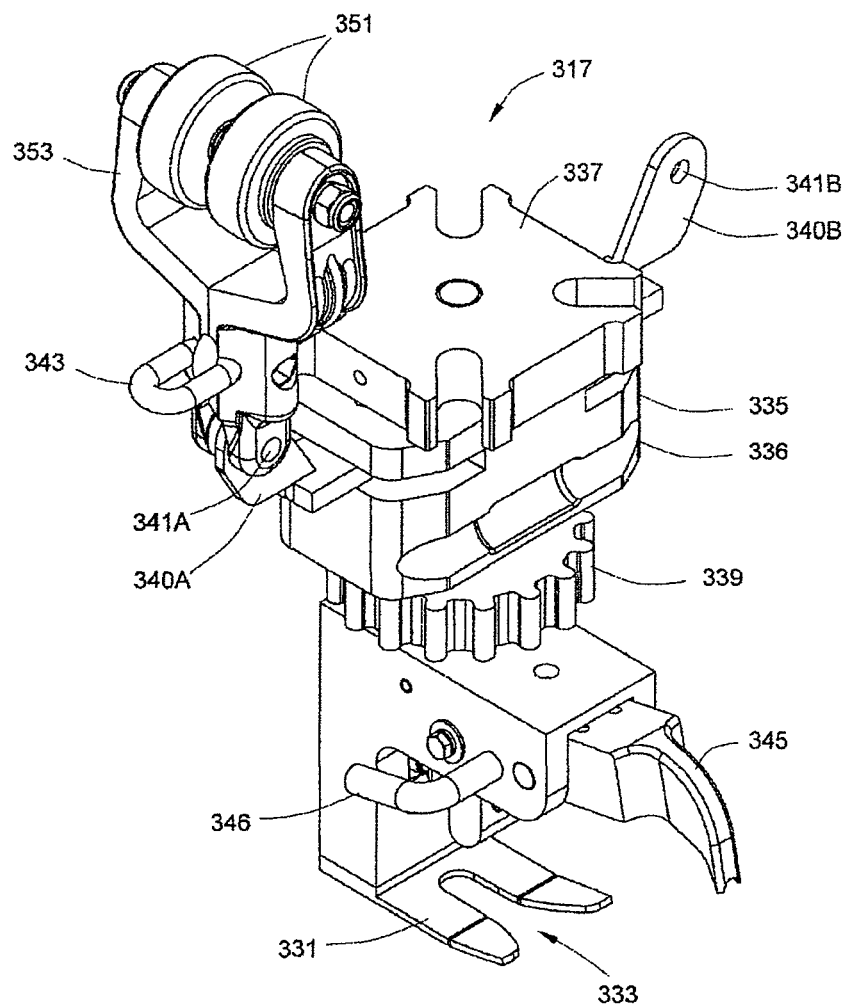
FIG. 18 is a perspective view of an alternative bone holder with swivelable locking arm open.

The bone holder 317 as shown in FIG. 18 is provided with the bifurcated receiving end 331, which defines a receiving slot 333 for receiving and supporting the hip knuckle (caput femoris) of the thigh bone (femur), with the knee knuckle (condylus) hanging substantially vertically downwardly. The receiving end 331 of the bone holder 317 is rotatably received in a bone holder block 335 by a central shaft (not shown but conventional), which is connected for rotation by a turning gear 337. Also connected to the central shaft for rotation of the receiving end 331 is a gear pinion 339. A first bracket 340A and a second 340B are mounted to the bone holder block 335. The brackets 340A and 340B are provided with a first opening 341A and a second opening 341B for attaching a first roller unit 353 and a second roller unit (not pictured for clarity). It is conceivable that brackets 340A and 340B are identical, but this is not required. Similarly, it is conceivable that the first roller unit 353 and the second roller unit are identical, but also this is not required. Typically, roller units are constructed from plastic, but many other materials may be suitable as well. Rollers 351 are provided on the roller unit 353 for movement along track means of the overhead conveyer means. The bone holder block 335 is provided with guide grove 336 for stabilizing the bone holder 317 while suspended by a pair of first and second the roller units 353 from the overhead conveyer means. Similar guide groves may also be provided on the opposite side but are hidden from view. The guide grove 336 provides additional support while cutting tissue. The roller unit preferably is provided with a shackle 343 for attaching to additional shackles and additional bone holders 317, not pictured for clarity, for forming an interlinked conveyer chain. Preferably, an interlinked chain is formed such that a first bone holder 317 and a second bone holder 317, forming a pair of adjacent bone holders, share the same roller unit. With such a construction, less roller units are required to form the interlinked chain, and more bone holders can be placed on the interlinked chain resulting in economy of space and an improved efficiency. The conveyer chain is formed in such a way that the chain is not limited to substantially lateral movement. Although not pictured in this embodiment, it is possible that the conveyer chain undergoes a change in elevation.

Figure 19:
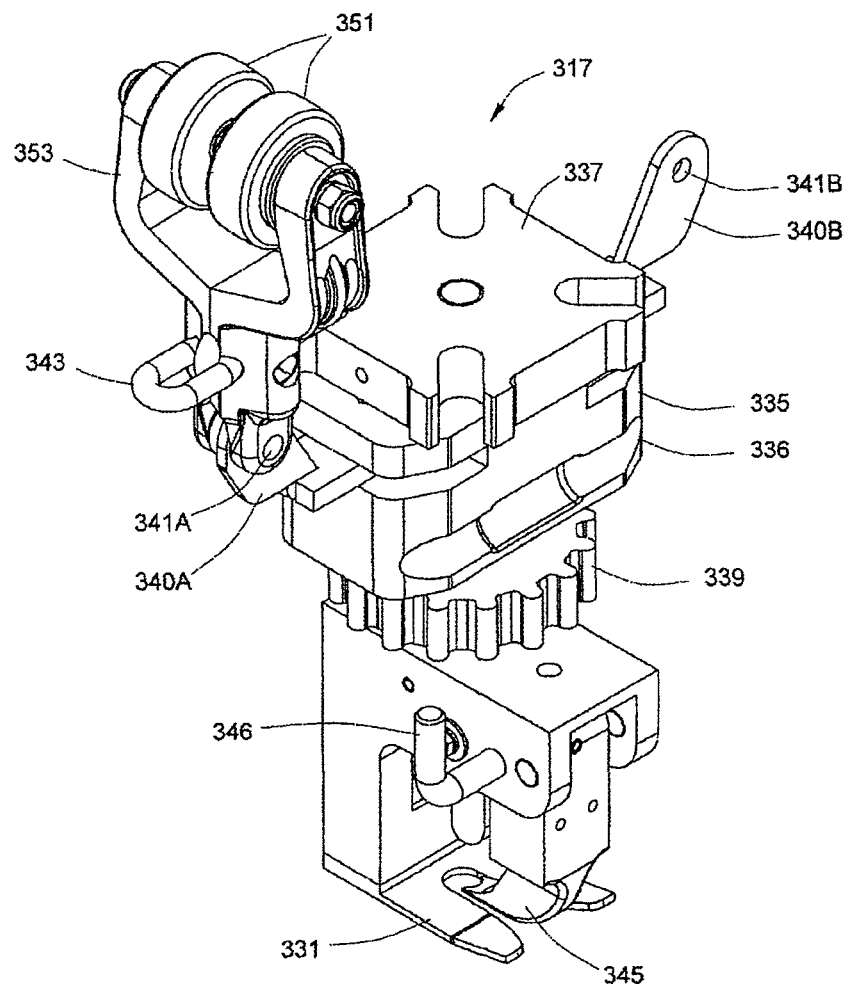
FIG. 19 is a perspective view of an alternative bone holder with swivelable locking arm closed.

The bone holder is provided with a swivelable locking arm 345. This swivelable locking arm 345 is mounted for swivelling from an open position, as shown in FIG. 18, to a locking position, as shown in FIG. 19, in which it will engage in the receiving slot 333 to prevent a thigh bone engaged in the receiving slot 333 to escape there from. Swivelling of the locking arm 345 is effected through either an arm 346 or the locking arm 345 itself. In the apparatus 301 the locking arm 345 is engaged by a guide rail assembly 375 at a location upstream of the second tissue cutting section 327 to close the swivelable locking arm 345. The arm rod 346 is engaged by an assembly of the apparatus (not shown) at a location downstream of the meat stripping and discharge section 329 to open the swivelable locking arm. Similar to the bone holder 17A of FIGS. 15 and 16 the swivelable locking arm locks itself in the closed position, so that it is not necessary to keep it engaged by a cam track for as long as the locking arm 345 needs to be closed as is the case with the bone holder 17 of FIGS. 3 and 4.

Rotational movements of the bone holders 317 by the turning gear 337 occur at generally the same positions by substantially the same means along the processing or conveying path as in the previous embodiment. As previously mentioned, the concept of a turning station is conventional and well known in the art. To avoid unnecessary repetition, reference can be had to the disclosure of EP 0 786 208 for a further description of such a turning station that generally uses one or more protrusions engaging the diagonal slots at the corner points of the turning gear 337 of the bone holders 317. As in the previous embodiment in the second tissue cutting section 327 the bone holder 317 will engage rotation station 363, in which its pinion gear 339 engages a toothed rack 373 by which it is rotated, while it is at the same time advanced by the conveyer chain.

At the loading section 323 an animal thigh is positioned to be grasped by the bifurcated receiving end 331 of the bone holder 317 (see FIG. 18) at the thigh bone shaft adjacent the hip knuckle (caput femoris). Preferably the animal thigh is also positioned with the front part of the knee knuckle facing outwards from the machine. Up to and including passing through the first tissue cutting section 325, the swivelable locking arm 345 will remain in its open position and facing outwardly with the bifurcated receiving end 331. Upon leaving the first tissue cutting section 325, the locking arm 345 is moved into its locking position by the guide rail assembly 375 engaging the swivelable locking arm 345 itself.

Figure 20:
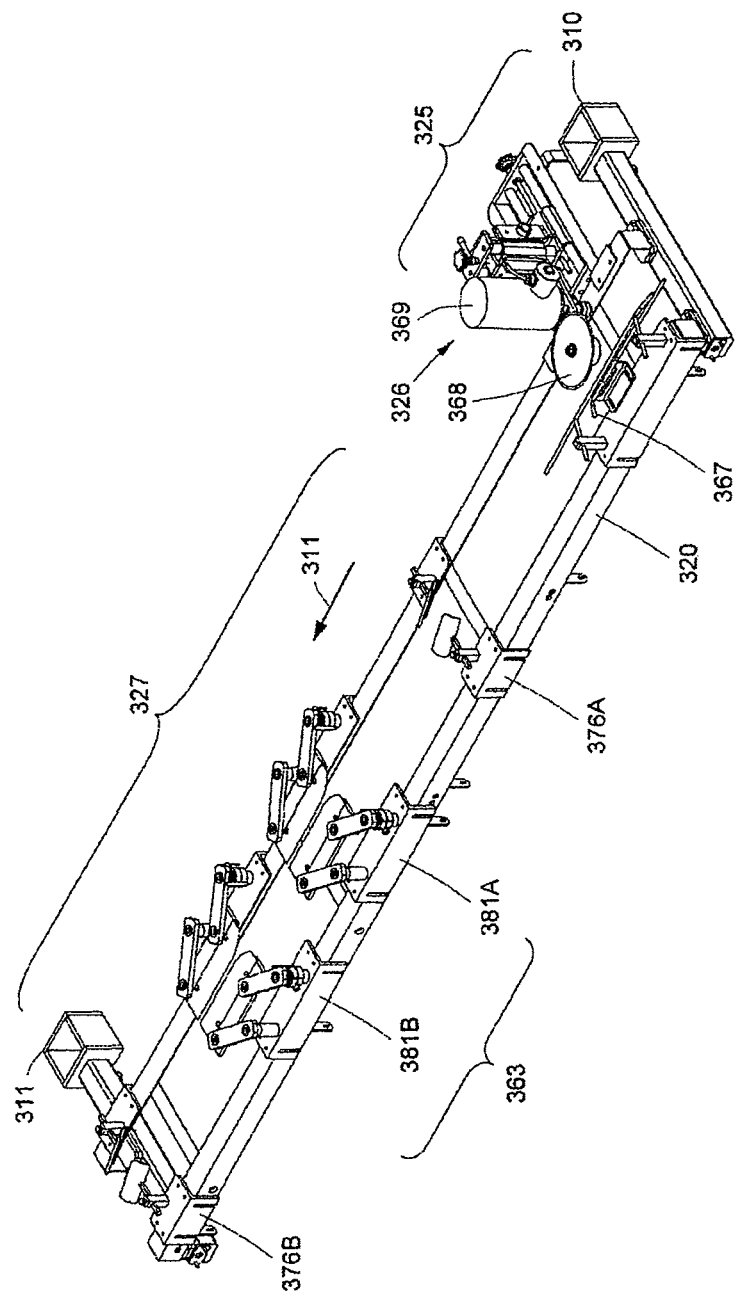
FIG. 20 is a perspective view of the first and second cutting sections of the alternative apparatus.
Figure 21:
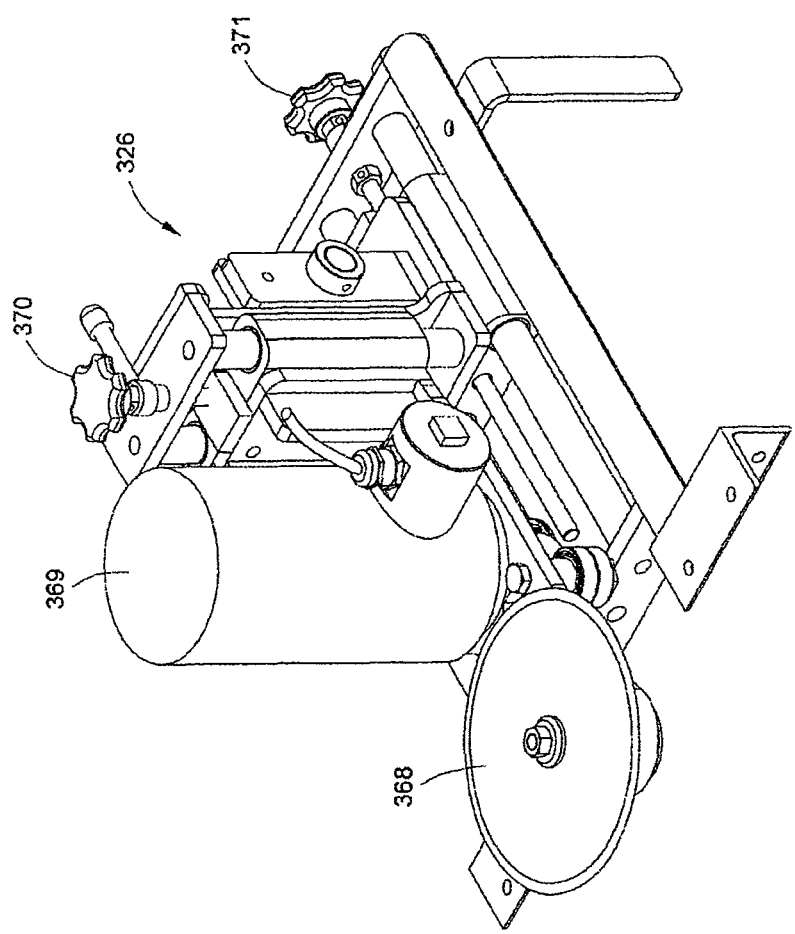
FIG. 21 is a perspective view of the cutting device of the first tissue cutting section.

From the first carousel 305 the bone holders 317 will advance along the overhead conveyor to the second linear section 307 and enter the first cutting section 325. Over the entire length of the first and second cutting section, the bone holder 317 will be stabilized by the guide grove 336 and a corresponding guide rail 304. Reference will now be made to FIG. 20, which shows the first and second tissue cutting sections 325 and 327. The tissue cutting sections 325 and 327 are mounted on a sub frame 320, which is preferably height adjustably mounted on the machine frame 319 by mounting brackets 310 and 311. The cutting station 326 of the first tissue cutting section 325 comprises a circular rotating cutting blade 368. Rotating cutting blade 368 is rotated by an electric motor unit 369. FIG. 21 shows a detailed view of the circular rotating cutting blade 368 and the electric motor unit 369. From FIG. 21 it is clear that the position of the circular rotating cutting blade is adjustable by vertical and horizontal screw adjustment devices, indicated by their respective adjustment knobs 370 and 371. The rotating cutting blade 368 is opposite a thigh bone guiding means 367 which engages the knee knuckle and assists in positioning the individual knee ends of the animal thighs for cutting tissue by the circular cutting blade 368. Note that the swivelable locking arm 345 is not yet closed (still open). The predetermined position is such that the back portion of the bone shaft directly adjacent to the knee knuckle passes against cutting blade 368, for cutting tissue that connects the meat to the bone. Thereby, such tissue is severed that is positioned adjacent the back of the knee knuckle end of the thigh bone.

From the first cutting section 325, the bone holders 317 will advance along the overhead conveyor. Before arriving at the second cutting section 327, the swivelable locking arm 345 is closed by the swivelable locking arm 345 itself being engaged by the guide rail assembly 375 as explained above. In order for the swivelable locking arm 345 to be engaged by the guide rail assembly 375, the bifurcated receiving end 331 of the bone holder 317 is facing outwards from the machine. Once in the closed position, the locking arm 345 is engaged in the receiving slot 333 of the bifurcated receiving end 331. A close-up detail of the second tissue cutting section 327 is shown in FIG. 20. While progressing through the second tissue cutting section 327 in the direction of arrow 311, an animal thigh suspended from one of the bone holders 317 successively passes a first pushing station 376A, a first cutting station 381A, a second cutting station 381B and a second pushing station 376B. These stations are mounted on frame 320. The first pushing station 376A receives the hip knuckle end of the thigh bone and pushes the meat on the thigh bone under the hip knuckle in substantially downwards direction before entering the first and second cutting stations 381A and 381B. These cutting stations are the same as the third cutting station 81 in the previous embodiment with the exception that the first set of parallel blades and second set of parallel blades are no longer mounted on one supporting frame 117. Instead the two stations 381A and 381B are individually mounted on the sub frame 320 such that the distance between the two sets of parallel blades is adjustable. While passing through the first and second cutting stations 381A and 381B the pinion gear 339 engages a toothed rack 373 by which the animal thigh will be rotated about an axis substantially coextensive with the longitudinal extent of the thigh bone shaft between its opposite end protuberances formed by the hip and knee knuckles for a predetermined number of revolutions.

With the arrangement of each knife blade of the first and second cutting stations being pivotally connected to a pair of substantially parallel pivoting arms the knife blades each remain generally parallel to the path of conveyance, but still have some freedom to deviate from the parallel position when the hip bone of an animal thigh passes there between. The knife edges are positioned with respect to the second linear conveyer section 307 at a level to engage tissue near the hip knuckle that connects the meat of an animal thigh to the bone shaft. The predetermined number of revolutions is chosen to ensure that all tissue connecting the meat to the hip bone adjacent the hip knuckle is severed. It should be clear to the skilled person that other arrangements of the third cutting station are also possible.

After passing through the first and second cutting stations 381A and 381B, the hip knuckle end of the thigh bone is received by the second pushing station 376B. The orientation of bone holder 317 at the second pushing station 376B is rotated 90° with respect to the orientation of bone holder 317 at the first pushing station. This ensures that the first and second pushing stations 376A and 376B act on different portions of the meat on the thigh bone that are perpendicular and opposite to one another. The 90° rotation can be effected by a turning station immediately following the first pushing station, by the choice of the predetermined number of revolutions, or by a combination thereof. The result of the first and second pushing stations is that the meat is partially pushed downwards from the hip knuckle, providing a better starting point for a meat stripper unit 365 of the meat stripping and discharge section 329.

As in the previous embodiment the meat stripping and discharge section 329 includes the second carousel 309 that receives the bone holders 317 from the second linear conveyer section 307 after these have been advanced through the second tissue cutting section 327. As the meat stripping and discharge section 329 is the same as in the previous embodiment with the exception of incorporating an additional third tissue cutting section 389, the meat stripping unit 365 will not be described in detail. Reference can be had to the meat stripping unit as provided in reference to the previous embodiment.

Similar to the previous embodiment the meat stripper unit 365, with gripper plates closed around the bone shaft, undergoes a vertically downward movement which strips the tissue from the bone. At the bottom of the bone, the gripper plates open slightly to allow the gripper plates to pass over the knee knuckle region of the thigh bone. Because the tissue holding the meat to the knuckle region of the thigh bone has already been severed sufficiently, the continued downward movement of the meat stripper unit will remove the meat from the thigh bone. This removed meat may then be collected by gravity in a collecting tray or alternatively by a collecting conveyer placed underneath the second carousel 309.

However, in order to further reduce waste and ensure that no meat clings to the thigh bone, the bone holder unit 317 passes through a third tissue cutting section 363 after the meat stripping unit. The third tissue cutting section 389 comprises an auxiliary cutting station 390, depicted in FIG. 22, which in turn comprises a guiding blade 395, a circular rotating cutting blade 394, an electric motor unit 393, a vertical screw adjustment device, indicated by its adjustment knob 392, and a mounting flange 391. The cutting station 390 is mounted to the machine frame 319 by the mounting flange 391 and is height adjustable by knob 392 of the vertical screw adjustment device. The circular cutting blade 394 is rotated by the electric motor 393. The auxiliary cutting station 390 is placed relative to the second carousel 309 and the bone holder unit 317 such that the thigh bone passes over the circular cutting blade 394, in order to avoid bone fragments in the collected meat. Any meat not removed by the meat stripping unit is guided by the guide blade 395 into the circular cutting blade 394, cut, and collected by gravity in the collecting tray or alternatively by the collecting conveyer placed underneath the second carousel 309.

After removal of the meat, the bone holders 317 continue their movement around the second carousel 309 and the locking arm 345 will be allowed to open again for release of the thigh bone from which the meat has been removed. Suitable means may additionally be provided to collect the discharged thigh bones, such as trays or conveyors (not shown but conventional).

Accordingly a method of mechanically deboning animal thighs for separating and collecting meat there from is disclosed, as well as an apparatus (1) and alternative apparatus (301) for performing this method, that includes automated individual processing steps. The processing steps include: grasping a thigh bone of an animal thigh at a hip knuckle with a bone holder (17, 317); cutting tissue near the hip knuckle; and engaging the thigh bone adjacent the bone holder with a meat stripper (165, 365). Further the processing steps include: moving the bone holder (17, 317) and meat stripper (165, 365) away from one another in a direction substantially coextensive with the longitudinal extend of the thigh bone; allowing the meat stripper (165, 365) to pass over the knee knuckle; and collecting the meat separated from the bone. In particular the method includes and each of the apparatuses (1, 301) performs the process step of cutting tissue adjacent a knee knuckle of the thigh bone, prior to allowing the meat stripper (165, 365) to pass over the knee knuckle. The apparatuses (1, 301) include a plurality of processing stations (23, 323, 25, 325, 27, 327, 29, 329, 68, 77, 79, 81, 381A, 381B, 389, 390) for carrying out the individual steps, and the processing stations are arranged along a path of conveyance defined by a conveyor chain (35, 41, 43, 335, 340A, 340B, 343) moving through a predefined path that is defined by a first linear conveyor section (3, 303), a first carousel (5, 305), a second linear conveyor section (7, 307), and a second carousel (9, 309).

It is thus believed that the operation and construction of the present invention will be apparent from the foregoing description. To the skilled person in this field of the art it will be clear that the invention is not limited to the embodiment represented and described here, but that within the framework of the appended claims a large number of variants are possible. Also kinematic inversions are considered inherently disclosed and to be within the scope of the present invention. The terms comprising and including when used in this description or the appended claims should not be construed in an exclusive or exhaustive sense but rather in an inclusive sense. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Features which are not specifically or explicitly described or claimed may be additionally included in the structure according to the present invention without deviating from its scope.

What is claimed is:

1. A method of separating meat from the elongated thigh bone of an animal thigh wherein the thigh bone has a hip knuckle at one end and a knee knuckle at an opposite end, the method comprising the steps of:
    (a) capturing the thigh bone adjacent the hip knuckle in a receiving slot of a bone holder to suspend the thigh from the hip knuckle of the thigh bone;
    (b) preventing the thigh bone from escaping from the receiving slot;
    (c) moving the bone holder and the suspended thigh along a processing path;
    (d) cutting tissue of the animal thigh near the hip knuckle;
    (e) engaging the thigh bone adjacent the bone holder with a meat stripper;
    (f) moving the bone holder and meat stripper away from one another in a direction substantially coextensive with the longitudinal extent of the thigh bone to strip the meat progressively from the thigh bone and gather the meat about the knee knuckle;
    (g) cutting tissue adjacent the knee knuckle of the thigh bone to release the meat from the thigh bone; and
    (h) collecting the meat.

2. The method of claim 1 wherein step (g) comprises supporting a portion of the thigh bone adjacent the knee knuckle and engaging the tissue adjacent the knee knuckle with a cutting blade.

3. The method of claim 2 further comprising the step of rotating the cutting blade.

4. The method of claim 1 wherein step (g) precedes step (d).

5. The method of claim 1 wherein step (g) comprises keeping a portion of the thigh bone adjacent the knee knuckle in engagement with a non-rotating knife blade while moving the animal thigh along the processing path.

6. The method of claim 5 wherein step (g) comprises supporting and moving a portion of the thigh bone adjacent the knee knuckle in contact with a cutting blade and wherein the keeping of the portion of the thigh bone adjacent the knee knuckle in engagement with a non-rotating knife blade is a further and following step, and cuts tissue that connects the meat to the bone at a side portion of the bone shaft adjacent the knee knuckle perpendicular to the tissue cut by the step of claim 1.

7. The method of claim 6, wherein step (g) precedes step (d) and wherein the supporting and moving step and the cutting tissue near the knee knuckle step each comprise cutting from opposite sides of the thigh bone adjacent the knee knuckle.

8. The method of claim 1 wherein step (d) comprises rotating the bone holder about an axis substantially coextensive with the longitudinal extent of the thigh bone while keeping a portion of the thigh bone adjacent the hip knuckle in engagement with a cutting blade.

9. The method of claim 8 wherein step (d) comprises passing the portion of the hip bone adjacent the hip knuckle between oppositely disposed cutting blades that are biased towards one another.

10. The method of claim 1 further comprising releasing the thigh bone from the bone holder following step (h).

11. The method of claim 1 wherein the processing path extends through a closed loop.

12. The method of claim 1 further comprising the step following step (d) of pushing a portion of the meat near the hip knuckle partially away from the hip knuckle in a direction toward the knee knuckle.

13. The method of claim 12 wherein the step of pushing a portion of the meat comprises substantially simultaneously pushing, subsequent to the step of cutting tissue near the hip knuckle, on a second portion of the meat near the hip knuckle away from the hip knuckle in a direction of the knee knuckle to expose the thigh bone for engagement with the meat stripper, wherein the second portion of the meat comprises a third area of tissue near the hip knuckle and a fourth area of tissue near the hip knuckle substantially parallel to the third area of tissue near the hip knuckle, and wherein the third area of tissue near the hip knuckle and the fourth area of tissue near the hip knuckle are substantially perpendicular to the first area of tissue near the hip knuckle and the second area of tissue near the hip knuckle.

* * * * *